United States Patent

Furuya

[11] Patent Number: 5,538,608
[45] Date of Patent: Jul. 23, 1996

[54] BUBBLE COLLECTION TYPE GAS ELECTRODE

[75] Inventor: Nagakazu Furuya, Yamanashi, Japan

[73] Assignees: Tanaka Kikinzoku Kogyo K.K., Japan; Nagakazu Furuya, Japan

[21] Appl. No.: 312,329

[22] Filed: Sep. 26, 1994

[30] Foreign Application Priority Data

| Sep. 25, 1993 | [JP] | Japan | 5-261889 |
| Jan. 7, 1994 | [JP] | Japan | 6-012135 |
| Jan. 14, 1994 | [JP] | Japan | 6-015795 |
| Feb. 7, 1994 | [JP] | Japan | 6-034094 |
| Feb. 7, 1994 | [JP] | Japan | 6-034095 |

[51] Int. Cl.$^6$ ............................................. C25B 11/02
[52] U.S. Cl. ............................................. 204/290 R
[58] Field of Search .......................... 204/280, 284, 204/290 R; 429/40, 41

[56] References Cited

U.S. PATENT DOCUMENTS

| 4,086,155 | 4/1978 | Jonville | 204/284 |
| 4,568,442 | 2/1986 | Goldsmith | 204/284 |
| 5,104,497 | 4/1992 | Tetzlaff et al. | 204/180.1 |
| 5,366,606 | 11/1994 | Tarancon | 204/265 |

FOREIGN PATENT DOCUMENTS

| 2059868 | 6/1971 | Germany | 204/284 |

*Primary Examiner*—Kathryn Gorgos
*Attorney, Agent, or Firm*—Klauber & Jackson

[57] ABSTRACT

Disclosed is a bubble collection type gas electrode having projections for collecting gas bubbles on the surface of the electrode. This electrode provides a sufficient contact between the bubbles and the gas diffusion layer so that the bubbles are likely to permeate the gas diffusion layer to reach the interface between the gas diffusion layer and a reaction layer so that an amount of the bubbles required for effecting the reaction may be supplied to obtain a satisfactory current density. The electrode may comprise a reaction layer having a plurality of projections, without a gas diffusion layer.

17 Claims, 10 Drawing Sheets

BUBBLE COLLECTION TYPE GAS ELECTRODE

BACKGROUND OF THE INVENTION

This invention relates to a bubble collection type gas electrode which is dipped in an electrolyte and collects bubbles of a reaction gas which are introduced into the electrolyte.

Conventionally, as shown in FIG. 1, a gas diffusion electrode has been composed of a reaction layer (a) which is prepared by impregnating a porous member composed of, for example, hydrophilic carbon black and PTFE (polytetrafluoroethylene) with a catalyst such as platinum, and a gas supply layer (b) composed of hydrophobic carbon black and PTFE bonded together by means of a nickel mesh current collector (c). This kind of gas diffusion electrode cannot collect bubbles so the idea to employ the gas diffusion electrode dipped in an electrolyte has not existed. A pair of the gas diffusion electrodes may be dipped in an electrolyte in an electrolytic cell and opposed to each other where a diaphragm (for example, a cation exchange membrane) is disposed therebetween. This gas diffusion electrode collects mixed bubbles such as hydrogen and oxygen in the electrolyte on the surface of the hydrophobic gas supply layer and supplies the collected gas as a reaction gas to the reaction layer for effecting an electrode reaction.

In this conventional gas diffusion electrode, however, the surface of the gas diffusion layer (b) possesses hydrophobicity so that a bubble (B) adhered to the surface of the gas diffusion layer (b) is pushed toward the surface due to the water pressure as shown in FIG. 1 and rapidly moves upward along the surface as shown in FIG. 2 to produce a drawback that the bubble only insufficiently stays on the electrode surface.

In order to increase the hydrophobicity of the surface of the gas supply layer, it may be coated with a porous PTFE film. Because of the hydrophobicity and the smoothness of the PTFE film, it is difficult for the reaction gas bubbles to adhere on the surface of the film so that the gas supply rate to the reaction layer through the gas diffusion layer is low, the electrode reaction is insufficient; and the electrolysis efficiency is low. Accordingly, the reaction cannot be effected in a high current density. Further, the hydrophobicity of the surface of the gas diffusion layer may be promptly lowered and easily wetted to make its life shorter due to the decrease of the gas supplying ability.

Due to these drawbacks, the conventional gas diffusion electrode has not been used when electrodes are to be dipped in the electrolyte.

SUMMARY OF THE INVENTION

The present invention has been made to overcome the above drawbacks.

Accordingly, an object of the present invention is to provide a bubble collection type gas electrode which can easily collect bubbles in an electrolyte on the surface of a gas diffusion layer during its use.

Another object of the invention is to provide a bubble collection type gas electrode which can increase the gas supply rate through the gas diffusion layer to a reaction layer to promote an electrode reaction and can elevate electrolysis efficiency so that the electrode may be operated in a high current density.

A further object of the invention is to provide a gas electrode which can remarkably lower the decrease of hydrophobicity of the gas diffusion layer surface to prevent the decrease of gas supplying ability so as to extend its life.

A still further object of the invention is to provide a gas electrode which may produce sufficient practical performance if a reaction gas required for effecting a reaction is supplied in the form of bubbles.

The present invention is a bubble collection type gas electrode in an electrolyte comprising a reaction layer and a gas diffusion layer bonded to each other where the gas diffusion layer has a plurality of projections on its surface for collecting the bubbles.

In this invention, bubbles collected on the surface of the gas diffusion layer move upward until they reach one or more projections on the gas diffusion layer on which the bubbles stay for a longer period of time so that a relatively larger amount of the bubbles may stay on and be retained on the surface of the gas diffusion layer. Accordingly, the bubbles retained thereon are likely to permeate the gas diffusion layer to reach the interface between the gas diffusion layer and the reaction layer at which a desired reaction takes place. In the electrode of the present invention, a sufficient amount of the bubbles or a reaction gas is supplied to the interface because the bubbles can be in contact with the gas diffusion layer for a relatively longer period of time.

When compared with a conventional gas diffusion electrode without projections, a higher current density at the same voltage can be obtained in the electrode of the present invention. Especially, if needle-like projections are employed, a current density several times larger than that of the conventional gas diffusion electrode can be obtained. This is because a larger amount of bubbles may be retained at the base portions of the needle-like projections in accordance with capillary phenomenon.

When the contact angle of the gas diffusion layer with water is 90° or more and that of the projection is less than 90°, the bubbles may be more effectively retained on the surface of the gas diffusion layer.

The projections may be hydrophilic, and may be formed as a belt-like film, needle-like projections, hood-like ones and upward semicircular projections at pertinent intervals. In these cases, the projections are preferably formed in zigzag arrangement.

When the hood-like projections are employed, they are formed on a base plate, which is attached to the surface of the gas diffusion layer. If the base plate is made of a metal, its resistance is made smaller. If, on the other hand, the base plate is made of synthetic resin, high resistance to corrosion can be obtained.

The hood-like projections having a downward bending portion most effectively retain the bubbles. If the adjacent two hood-like projections are connected, the bubbles retained in one projection may be distributed to the other.

The projections may also be hydrophobically treated, that is, coated with such hydrophobic material as PTFE. Because of the hydrophobic projections, the surface of the gas diffusion layer is hydrophobic, that is, resistant to wetting and uneven so that the lowering of the hydrophobicity is remarkably smaller than that of the conventional gas diffusion electrode. Accordingly, the life of this electrode can be extended.

In place of the gas electrode mentioned above, the invention includes another gas electrode which essentially consists of a reaction layer having a plurality of projections without the gas diffusion layer. In other words, the gas diffusion layer may be omitted.

Hydrophilic carbon black employed in the present invention possesses on its surface an active group having affinity with water such as —COOH group, and is easily dispersed in water. On the other hand, hydrophobic carbon black may be graphitized, possesses substantially no active group having affinity with water and is not dispersed in water as it is.

DETAILED DESCRIPTION OF THE INVENTION

Figure 1:
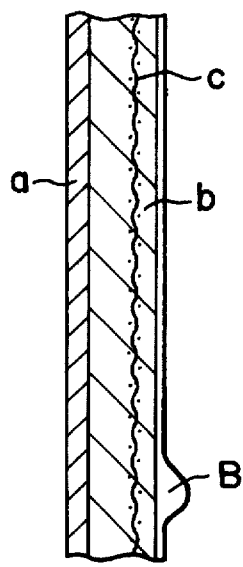
FIGS. 1 and 2 are sectional views showing the function of a conventional gas diffusion electrode.
Figure 2:
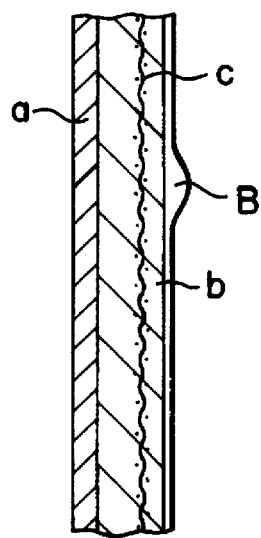
Figure 3:
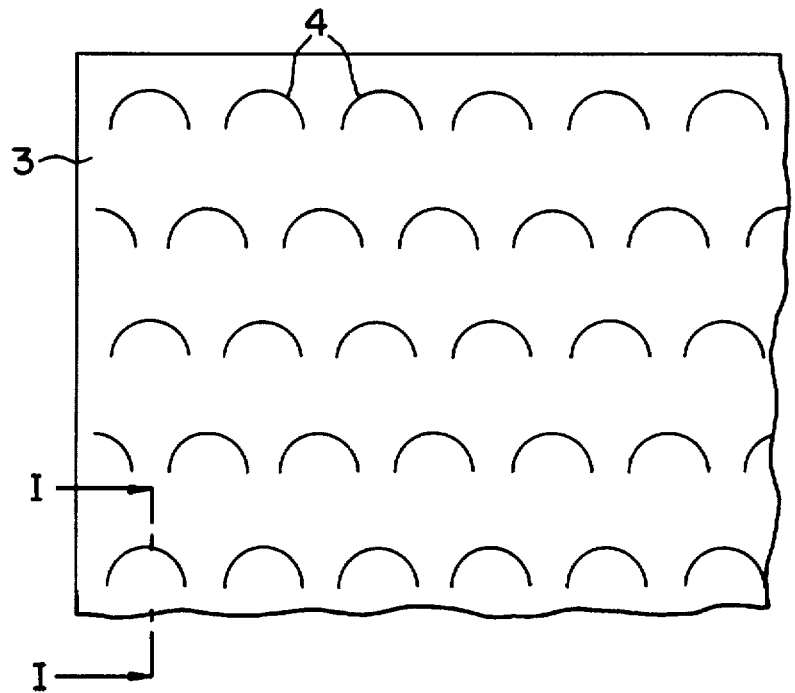
FIG. 3 is an elevational view of a first embodiment of a bubble collection type gas electrode in accordance with the present invention.
Figure 4:
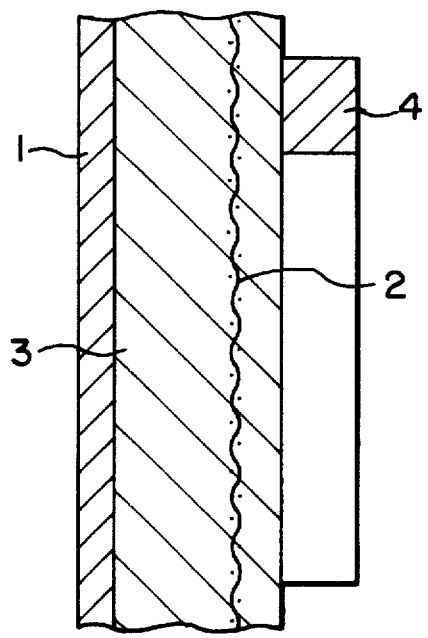
FIG. 4 is a sectional view of the gas electrode of FIG. 3 taken along the line I—I.

As shown in FIGS. 3 and 4, a first embodiment of a bubble collection type gas electrode in accordance with the present invention may consist of a reaction layer 1 made of hydrophobic carbon black, hydrophilic carbon black and polytetrafluoroethylene (hereinafter referred to as PTFE) and impregnated with a platinum catalyst, a gas diffusion layer 3 made of hydrophobic carbon black and PTFE and bonded to the reaction layer and a current collecting mesh 2 or a current collecting porous member made of nickel disposed in the gas diffusion layer 3. A plurality of semicircular hydrophilic projections 4 made of hydrophilic carbon black and PTFE are disposed zigzag at average horizontal and vertical intervals are formed on the surface of the gas diffusion layer 3.

Figure 5:
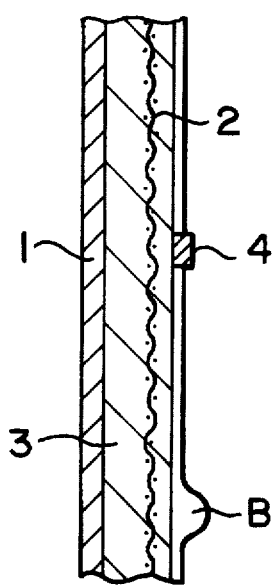
FIGS. 5 and 6 are sectional views showing the function of the gas electrode of FIGS. 3 and 4.

In this gas electrode, as shown in FIG. 5, a bubble (B) adhered to the surface of the gas diffusion layer 3 moves upward while being pushed to the surface of the gas diffusion layer 3 due to the water pressure. When the bubble reaches to the hydrophilic projection 4, the elevation thereof is momentarily depressed so that the bubble (B) stays on the lower surface of the hydrophilic projection 4.

Accordingly, the volume of the reaction gas which can be retained on the surface of the electrode may be increased so that the electrode can be operated at a high current density with a lesser amount of the bubbles.

Figure 7:
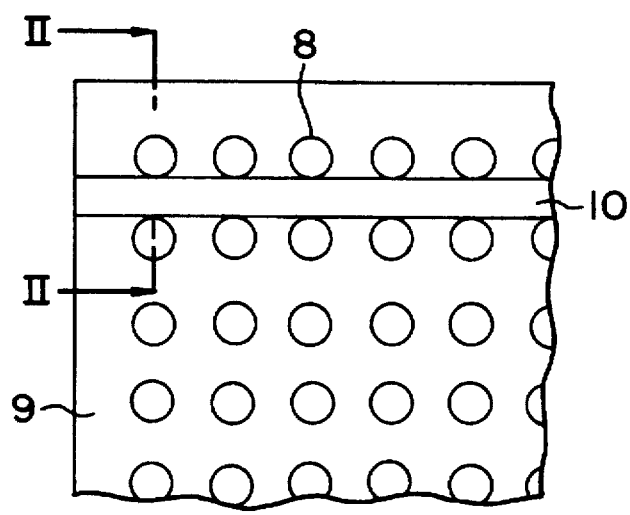
FIG. 7 is an elevational view of a second embodiment of a gas electrode having a hydrophobic film in accordance with the present invention.
Figure 6:
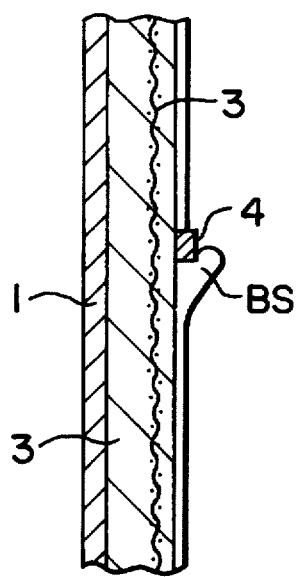
Figure 8:
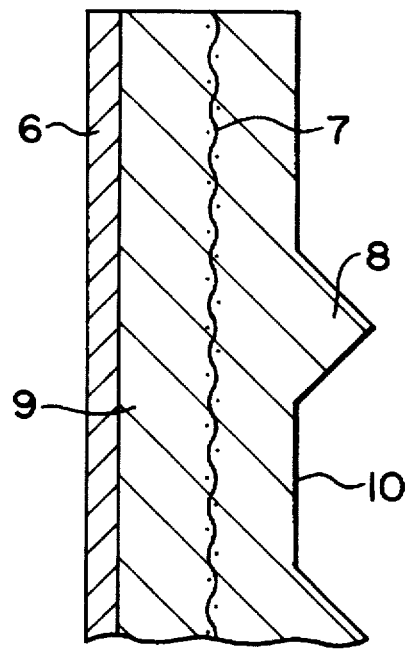
FIG. 8 is a sectional view of the gas electrode of FIG. 6 taken along the line II—II.

As shown FIGS. 7 and 8, a second embodiment of a gas electrode of the present invention may similarly consist of a reaction layer 6, a gas diffusion layer 9 bonded to the reaction layer 6 and a current collecting mesh 7 disposed in the gas diffusion layer 9. The surface of the gas diffusion layer 9 has a plurality of projected hydrophilic projections 8, having a circular conical shape at average horizontal and vertical intervals. Between two adjacent rows of the projections 8, a horizontal belt-like film 10 made of perfluorinated ionomer is formed on the gas diffusion layer 9. The film 10 is useful for elevating the hydrophobicity.

Figure 9:
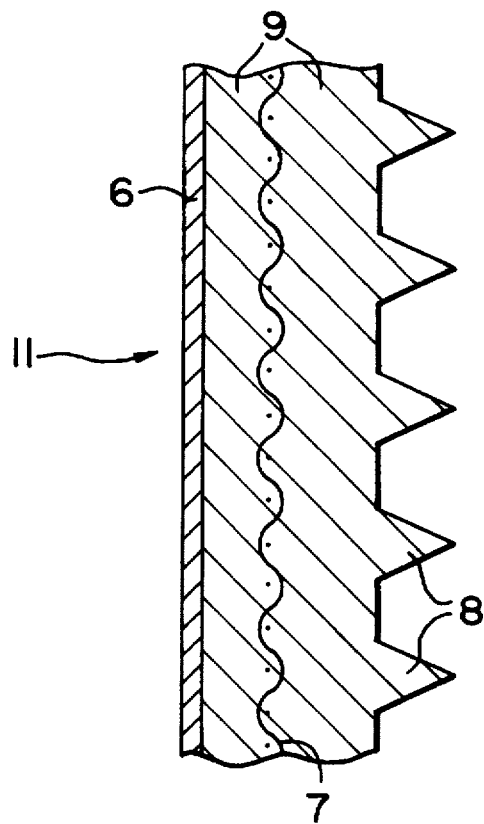
FIG. 9 is a sectional view of a third embodiment of a gas electrode in accordance with the present invention the same as that of FIGS. 7 and 8 except that the hydrophobic film is not provided.

An electrode 11 of FIG. 9 is the same as that of FIGS. 7 and 8 except that the film 10 is not formed. This electrode can be made in accordance with the following procedures.

Figure 10:
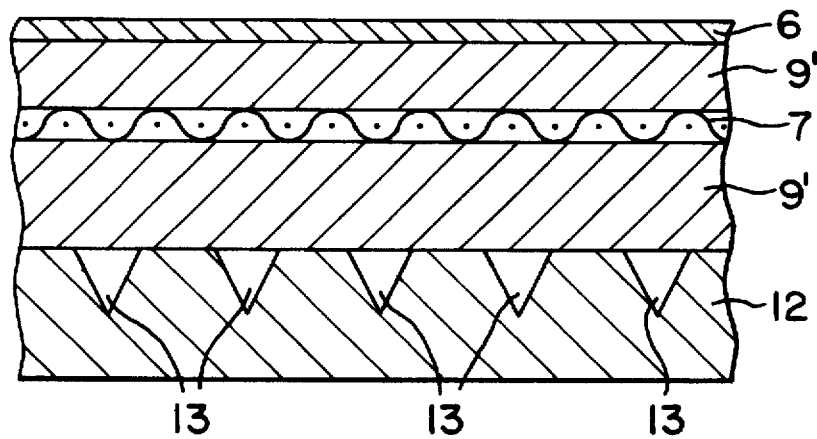
FIG. 10 is a sectional view illustrating a process of preparing the electrode of FIG. 9.

On a stainless plate 12 on the surface of which such a hydrophobic agent as PTFE is coated, a plurality of conical apertures 13 are formed at average horizontal intervals. On the plate 12 having the apertures 13, a gas diffusion layer sheet 9' is disposed, and the current collector 7 made of nickel is disposed on the gas diffusion layer sheet 9', and further the other gas diffusion layer sheet 9' is disposed on the current collector 7 as shown in FIG. 10. The said stack is hotpressed to prepare the electrode 11 having a plurality of the needle-like projections 8.

Figure 11:
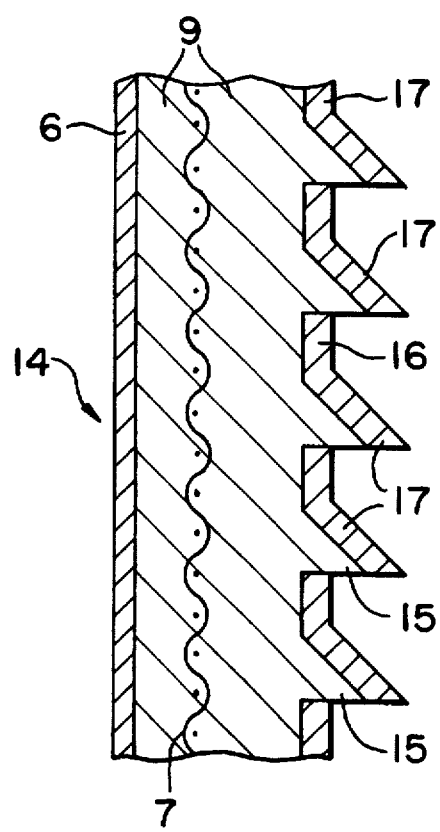
FIG. 11 is a sectional view of a fourth embodiment of a gas electrode in accordance with the present invention.

An electrode 14 of FIG. 11 has a similar structure to that of the electrode of FIG. 9. On the surface of the gas diffusion layer 9, in place of the projections 8 of FIG. 9, a plurality of triangular pyramidal projections 15 are formed, and a porous plate 16 which has the same number of downward bending members 17 as the projections 15 and is made of nickel on the whole surface of which PTFE powders have been coated by diffusion plating is attached to the surface of the gas diffusion layer 9 and to the slopes of the bending members 17.

Figure 12:
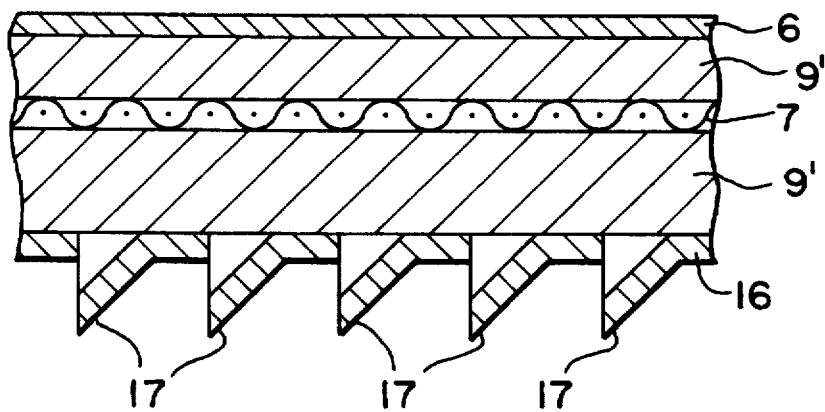
FIG. 12 is a sectional view illustrating a process of preparing the electrode of FIG. 11.

This electrode can be made similarly to the procedures mentioned in connection with FIG. 10 as shown in FIG. 12. On the porous plate 16, the gas diffusion layer sheet 9' is disposed, and the current collector 7 is disposed on the gas diffusion layer sheet 9', and further, the other gas diffusion layer sheet 9' is disposed on the current collector 7. The said stack is then hotpressed to prepare the electrode 14.

Figure 13:
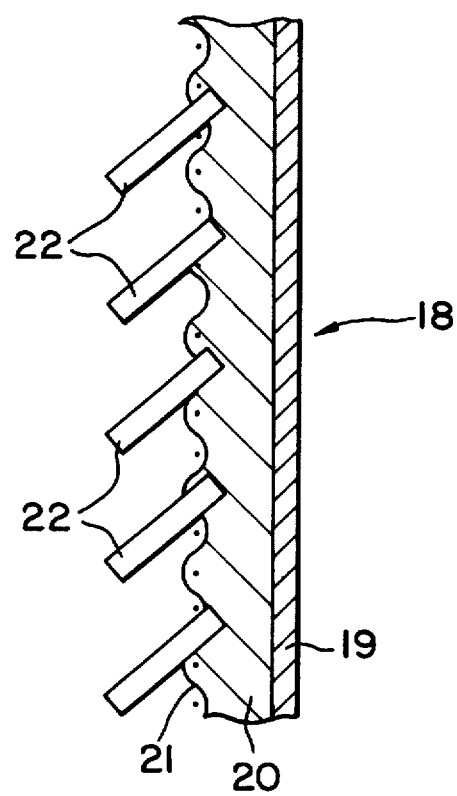
FIG. 13 is a sectional view of a fifth embodiment of a gas electrode in accordance with the present invention.

An electrode 18 of FIG. 13 may be prepared by piling a gas diffusion layer 19, a reaction layer 20 and a current collector mesh 21, hotpressing the piled body and connecting a plurality of hydrophobically treated needles 22 downward slanted at an angle about 45° to the current collector mesh 21.

Figure 14:
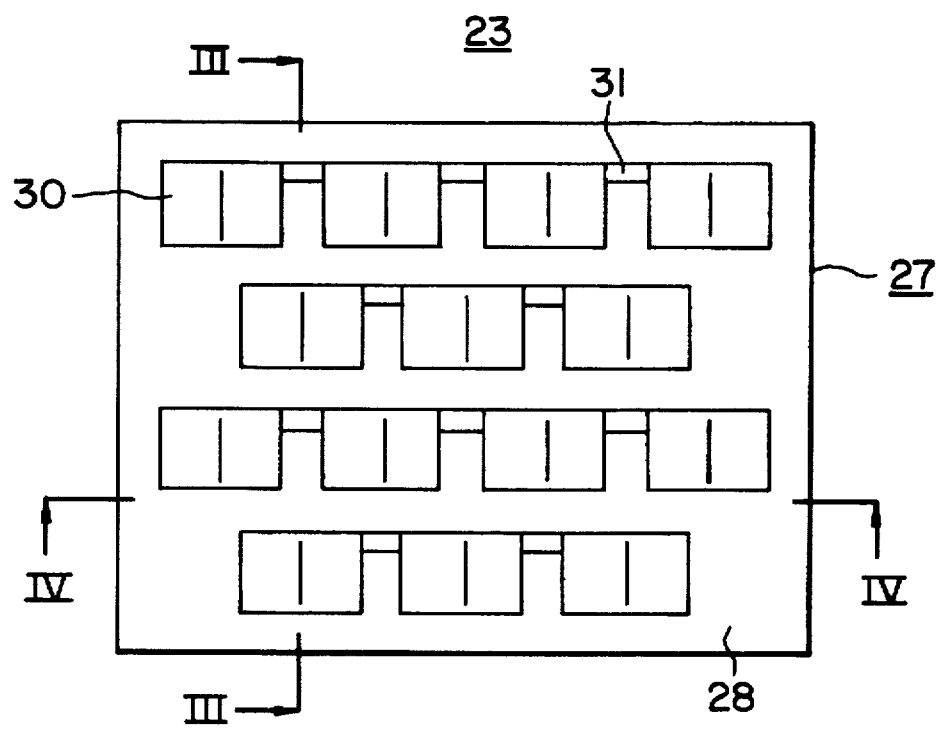
FIG. 14 is an elevational view of a sixth embodiment of a gas electrode in accordance with the present invention.
Figure 15:
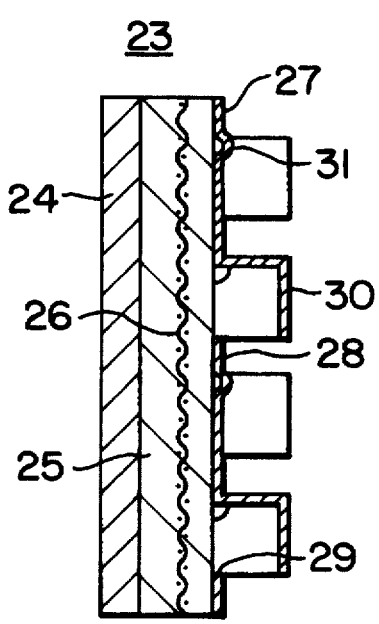
FIG. 15 is a sectional view of the electrode of FIG. 14 taken along the line III—III.
Figure 16:
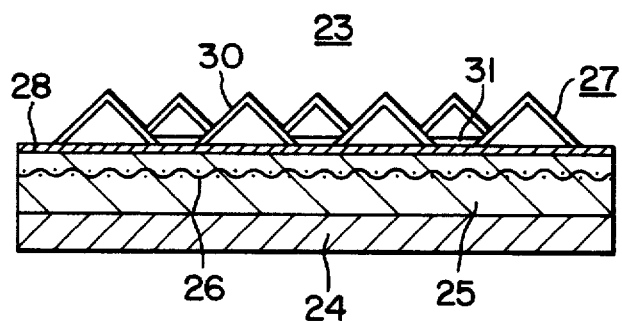
FIG. 16 is a sectional view of the electrode of FIG. 14 taken along the line IV—IV.

An electrode 23 of FIGS. 14 to 16 may similarly consist of a reaction layer 24, a gas diffusion layer 25 having a current collector 26 and a bubble collecting and retaining member 27 bonded to the surface of the gas diffusion layer 26. The bubble collecting and retaining member 27 is employed for collecting and retaining bubbles mixed in an electrolyte and for supplying the retained bubbles to the gas diffusion layer 25. The member 27 may consist of a base plate 28, a plurality of rectangular openings 29 zigzag formed on the base plate 28, a plurality of hoods 30 integrated with and projected from the base plate 28 of which an end is open and which individually cover the respective openings 29 and a plurality of means 31 for connecting two adjacent hoods 30. The bubble collecting and retaining member 27 may be formed by drawing.

The gas electrode 23 may be employed by dipping it vertically in an electrolyte and downward disposing the hoods 30. Bubbles mixed in the electrolyte are collected and retained by means of the respective hoods 30, and then, the retained bubbles are supplied to the gas diffusion layer 25 from the openings 29.

Figure 17:
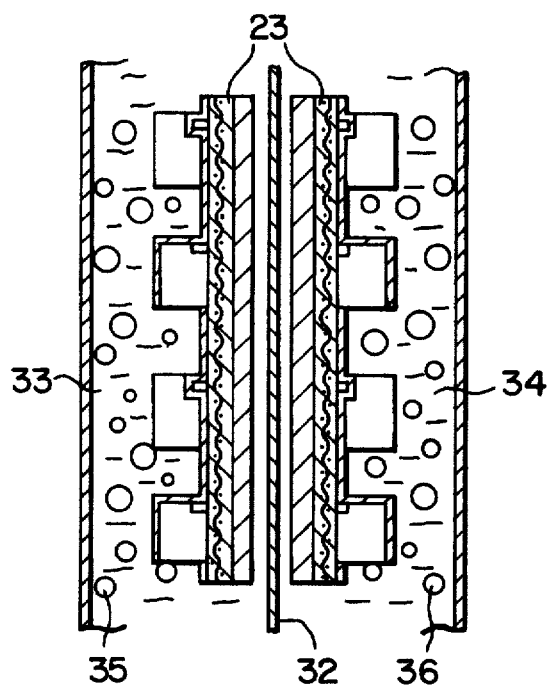
FIG. 17 is an elevational sectional view of a hydrogen-oxygen fuel cell employing the gas electrode of FIG. 14.

FIG. 17 illustrates a hydrogen-oxygen fuel cell employing a pair of the gas electrodes 23 of FIG. 14. The two electrodes 23 are opposed with each other on each side of a diaphragm 32 placed in an electrolytic cell 33 filled with an electrolyte 34 such as a potassium hydroxide aqueous solution. Bubbles 35, 36 of hydrogen and oxygen are supplied by means of bubbling.

Figure 18:
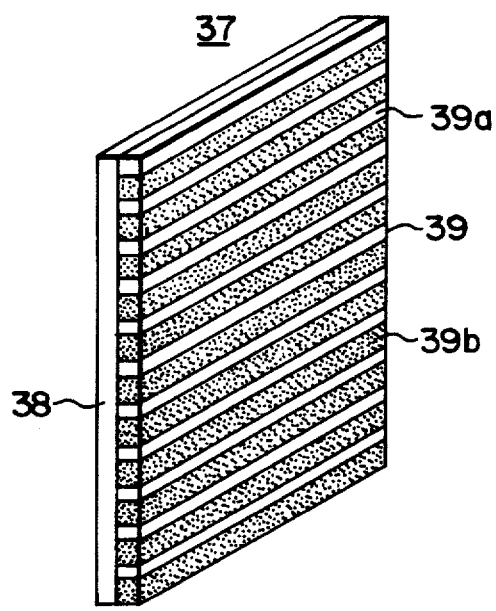
FIG. 18 is a perspective view of a seventh embodiment of a gas electrode in accordance with the present invention.
Figure 19:
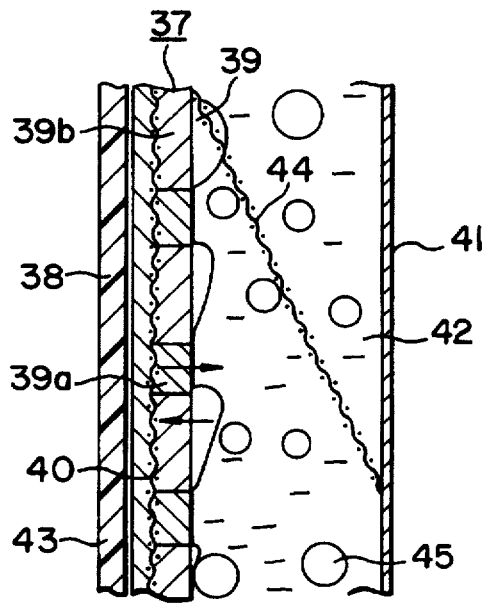
FIG. 19 is an elevational sectional view of a hydrogen-oxygen fuel cell employing the gas electrode of FIG. 18.

An electrode 37 of FIG. 18 may similarly consist of a reaction layer 38 and a gas diffusion layer 39 and a current collector mesh 40 (refer to FIG. 19). The gas diffusion layer 39 is composed of a plurality of hydrophilic porous linear members 39a and a plurality of hydrophobic porous linear members 39b alternately disposed and bonded.

The electrode 37 of FIG. 18 may be prepared by making a hydrophilic porous sheet with hydrophilic carbon black and PTFE and a hydrophobic porous sheet with hydrophobic carbon black and PTFE, alternately piling the two kinds of the porous sheets, slicing the piled sheets in a direction of thickness to form a gas diffusion layer, piling in this turn, a reaction layer, a nickel current collector and the gas diffusion layer, and hotpressing the piled members.

A fuel cell of FIG. 19 is composed of an electrolytic cell 41 filled with an electrolyte 42, the electrode 37 of FIG. 18 dipped in the electrolyte 42, an ion exchange membrane 43 adjacent to the reaction layer 38 side of the electrode 37 and a guide mesh 44 introducing a bubble 45 to the surface of the gas diffusion layer 39.

Figure 20:
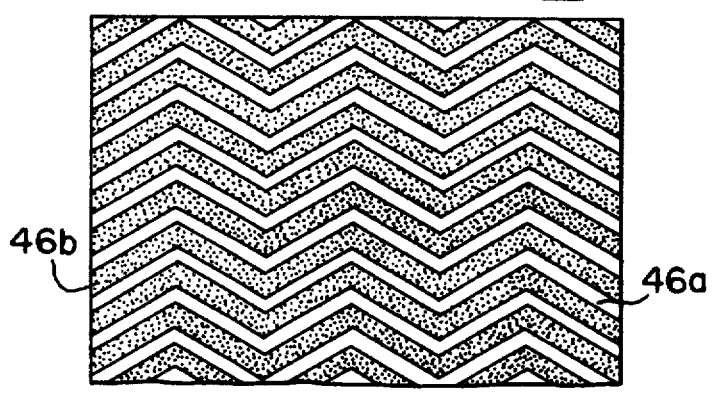
FIGS. 20 and 21 are elevational views of eighth and ninth embodiments of a gas electrode in accordance with the present invention, respectively.
Figure 21:
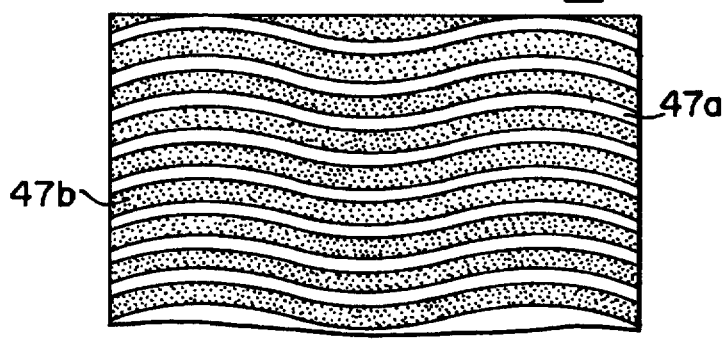

In place of the electrode 37 of FIG. 18, two other electrodes shown in FIGS. 20 and 21 may be employed. The electrode (gas diffusion layer) 46 of FIG. 20 is composed of a plurality of slightly bent hydrophilic porous linear members 46a and a plurality of slightly bent hydrophobic porous linear members 46b alternately piled. The electrode (gas diffusion layer) 47 of FIG. 21 is composed of a plurality of slightly curved hydrophilic porous linear members 47a and a plurality of slightly curved hydrophobic porous linear members 47b alternately piled.

Figure 22:
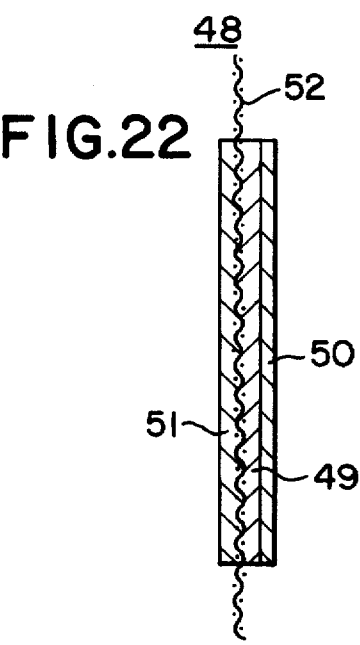
FIG. 22 is a sectional view of a tenth embodiment of a gas electrode in accordance with the present invention.
Figure 23:
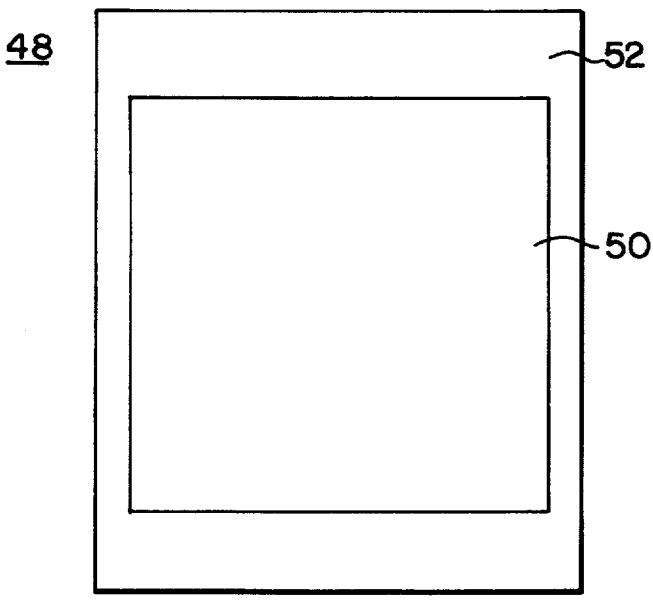
FIG. 23 is a side elevational sectional view of the gas electrode of FIG. 22.

A bubble collection type gas electrode 48 of FIGS. 22 and 23 is composed of a gas diffusion layer 49 having a bonded hydrophobic layer 50, a reaction layer 51 bonded to the gas diffusion layer 49, and a metal mesh 52 such as a titanium mesh coated with platinum or a nickel mesh which is electrolyte-permeable and bubble-impermeable, disposed between the gas diffusion layer 49 and the reaction layer 51. The outer edge of the metal mesh 52 extends beyond the periphery of the gas diffusion layer 49.

In order to prepare this electrode 48, the reaction layer 51 and the gas diffusion layer 49 are hot pressed with the metal mesh 52 between the two layers at least part of the metal mesh 52 being exposed, and a PTFE porous member is bonded as the hydrophobic layer 50 to the gas diffusion layer 49. The metal mesh 52 may be formed by piling a plurality of meshes having pores of different sizes, and only the exposed portions may be reinforced with a thick metal mesh. Such a hydrophilic member as a glass filter may be bonded to the exposed portions.

Figure 24:
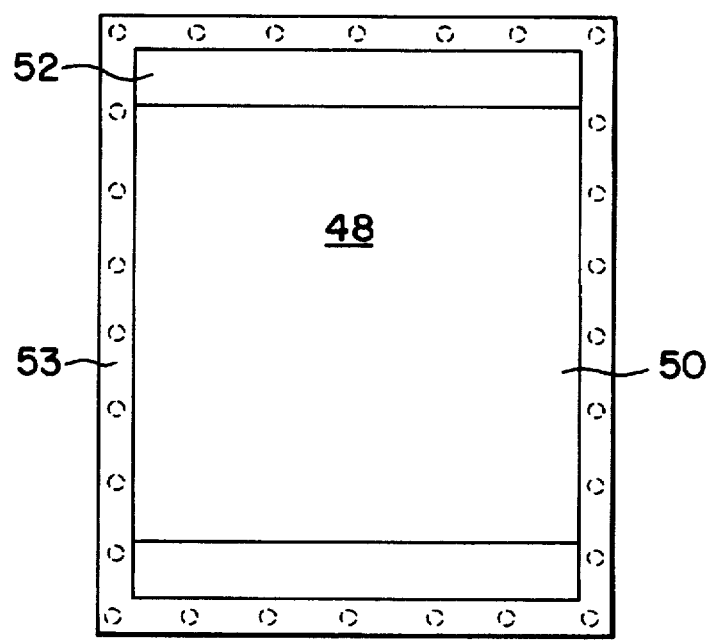
FIG. 24 illustrates a side elevational sectional view of an electrolytic cell employing the gas electrode of FIG. 22.

The electrode 48 as shown in FIG. 24 is installed in an electrolytic cell (not shown) by welding the periphery of the metal mesh 52 leaving the upper and lower portions to a metal frame 53 so as to divide the interior of the electrolytic cell by the metal mesh 52.

In order to adapt the electrolytic cell employing the above-mentioned electrode to a fuel cell, a pair of the bubble collection type gas electrodes 48 are closely disposed so that the respective reaction layers are opposed to each other to divide the interior of the electrolytic cell 54 of the fuel cell by means of their metal meshes 52, and the electrodes 48 are secured to the metal frame 53 of the electrolytic cell 54 by means of welding through the periphery of each metal mesh 52.

Figure 25:
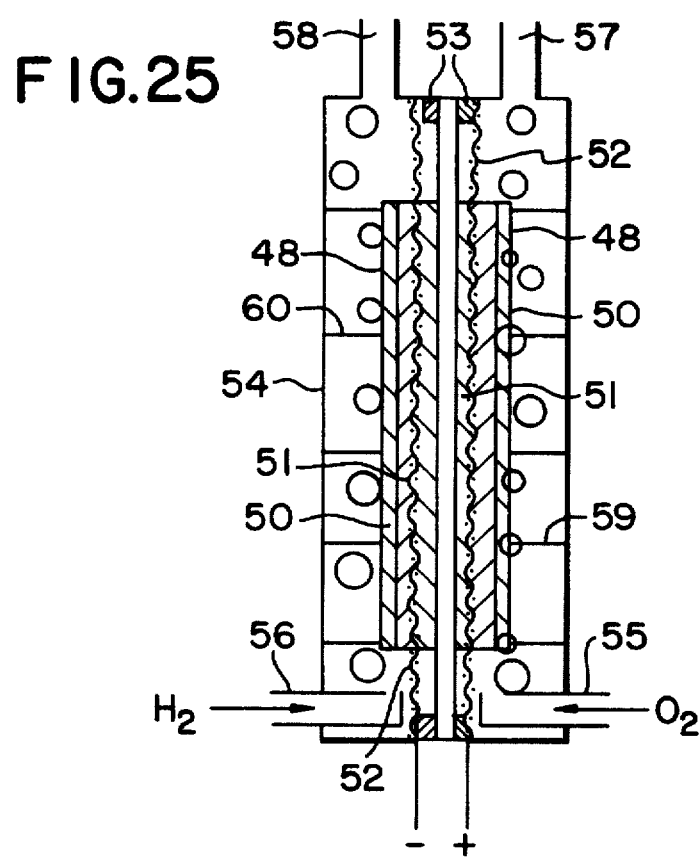
FIG. 25 is a view showing an example of a fuel cell employing the gas electrode of FIG. 22.

In FIG. 25, 55 and 56 denote an oxygen nozzle for bubbling an oxygen gas and a hydrogen nozzle for bubbling a hydrogen gas, respectively, and 57 and 58 denote an oxygen discharging pipe and a hydrogen discharge pipe, respectively. Further, 59 and 60 denote baffle plates hydrophobically treated which promote a collecting efficiency of bubbles and distribute the bubbles to the whole surface of the electrodes.

Figure 26:
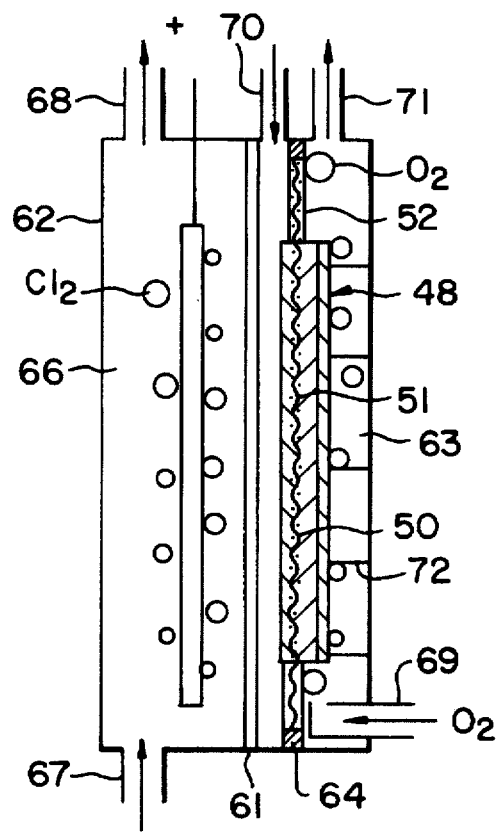
FIG. 26 is a view showing another example of an ion exchange membrane electrolytic cell for saline water employing the gas electrode of FIG. 22.

In order to adapt the electrolytic cell employing the above-mentioned electrode to an ion exchange membrane electrolytic cell for saline water electrolysis, the gas electrode 48 used as an oxygen cathode is opposed to a cation exchange membrane 61 which dividing an electrolytic cell 62 into a cathode chamber 63 and the membrane is adhered to a metal frame 64 of the cathode chamber 63 through the periphery of the metal mesh 52. In this case, the upper and lower portions of the metal mesh 52 may be bent so that the interval between the metal mesh 52 and the cation exchange membrane 61 is larger than that between the reaction layer 51 and the cation exchange membrane 61 for easy installation and easy supply of the electrolyte. In FIG. 26, 65 denotes an insoluble anode disposed in an anode chamber 66, 67 denotes a saline water supply pipe for supplying saturated saline water to the anode chamber 66, and 68 denotes a saline water discharge pipe for discharging the saline water with a chlorine gas produced in the anode chamber 66.

In FIG. 26, 69 denotes an oxygen nozzle for bubbling an oxygen gas to the cathode chamber 63 of the hydrophobic layer side, 70 denotes an aqueous solution supply pipe for supplying diluted aqueous caustic soda solution to the cathode chamber 63 of the reaction layer 51 side, and 71 denotes a discharge pipe for discharging a concentrated caustic soda solution together with the oxygen gas from the cathode chamber 63 of the hydrophobic layer side. Element 72 is a baffle plate hydrophobically treated which promotes a collecting efficiency of bubbles and distributes the bubbles to the whole surface of the electrodes.

In addition to electrolytic cell 61 being vertically installed, it may also be horizontally or slantly installed so that hydrophobic layer 50 is located under the electrode 48 for easy collection of the oxygen gas.

Unevenness may be formed on the surface of the hydrophobic layer 50 of the electrode 48 for improving the flow of the electrolyte and the collection of the bubbles.

Figure 27:
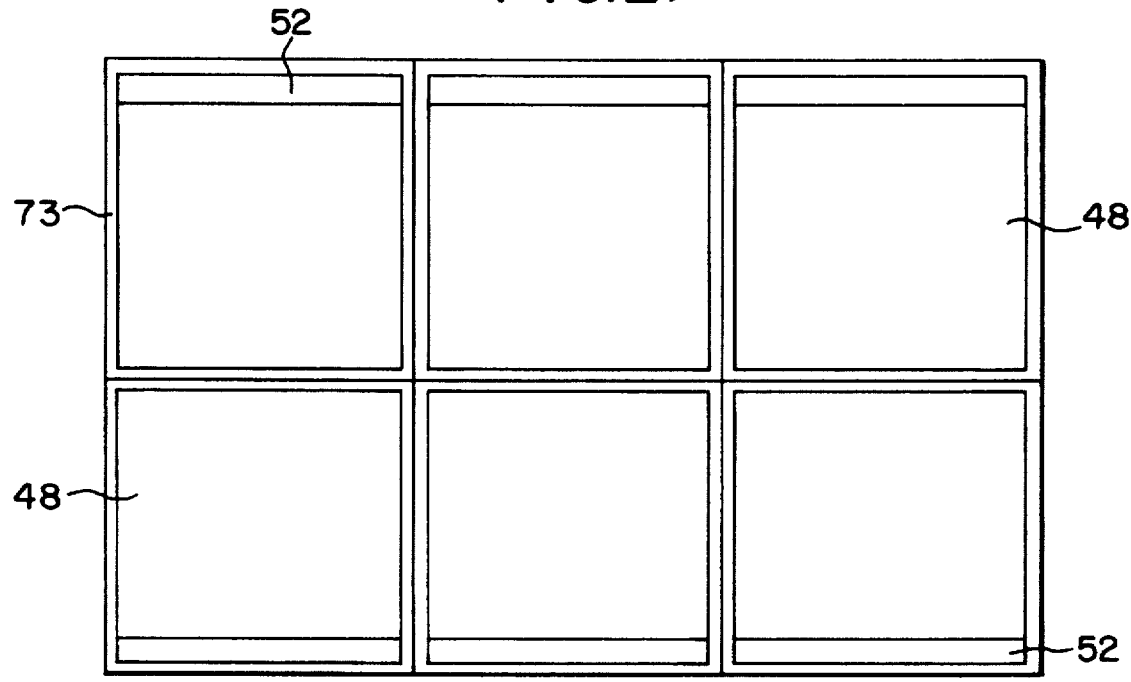
FIG. 27 is a view showing a further example of an electrolytic cell employing the gas electrode of FIG. 22.

In FIG. 27, another electrolytic cell 48 employing the above gas electrode is exemplified.

In this electrolytic cell, each gas electrode 48 is installed in each lattice-like metal frame 73 by spot-welding the periphery of the metal mesh 52 leaving its upper and lower portions to make the cell larger.

In order to make the large scale electrolytic cell, a plurality of the gas electrodes are bonded to a lath having a thickness of about 1 mm, which may be bonded to a lattice-like metal rib of the electrolytic cell. In this case, the lath may be located at either of the reaction layer 51 side and the hydrophobic layer 50 side.

Figure 28:
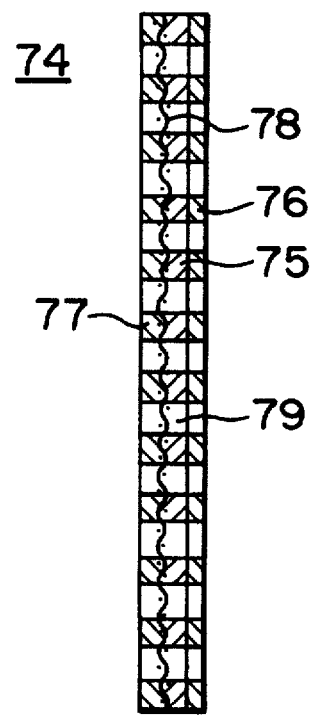
FIG. 28 is a sectional view of an eleventh embodiment of a gas electrode in accordance with the present invention.
Figure 29:
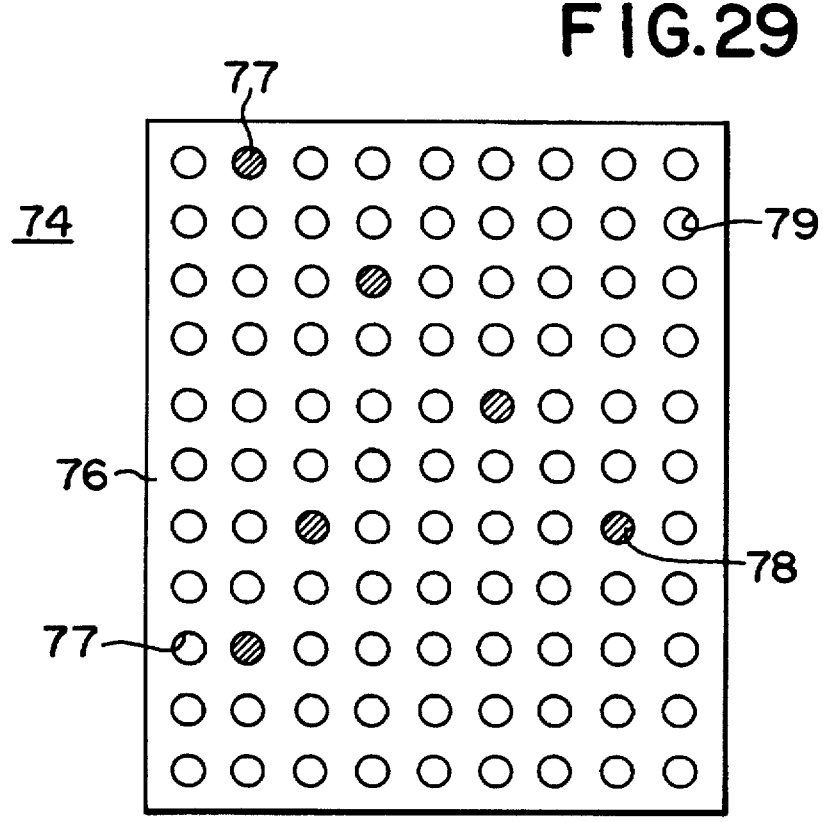
FIG. 29 is a side elevational view of the electrode of FIG. 28.

A gas electrode 74 of FIGS. 28 and 29 is composed of a gas diffusion layer 75 having a bonded hydrophobic layer 76, a reaction layer 77 to be bonded to the gas diffusion layer 75 and a metal mesh 78 such as a titanium mesh coated with platinum or a nickel mesh which functions as a current collector and is electrolyte-permeable and bubble-impermeable and disposed between the gas diffusion layer 75 and the reaction layer 77. The metal mesh 78 is exposed to a plurality of apertures 79 perforated through the reaction layer 77, the gas diffusion layer 75 and the hydrophobic layer 76.

This electrode 74 may be equipped in an electrolytic cell such as a fuel cell and an ion exchange membrane saline water electrolytic cell by spot-welding the metal mesh 78 exposed to the pertinent aperture 79 to a metal frame or a lattice-like meal rib of the electrolytic cell so that the interior of the electrolytic cell is partitioned by the electrode 74.

EXAMPLES

Although the bubble collection type gas electrode will be described, these Examples do not restrict the present invention.

EXAMPLE 1

A gas electrode shown in FIGS. 3 and 4 composed of a reaction layer made of hydrophobic carbon black, hydrophilic carbon black and PTFE and impregnated with a platinum catalyst having a thickness of about 0.1 mm, a gas diffusion layer made of hydrophobic carbon black and PTFE and bonded to the reaction layer, a current collecting mesh made of nickel disposed in the gas diffusion layer, and a plurality of semicircular hydrophilic projections made of hydrophilic carbon black and PTFE having a width of about 11 mm, a height of about 6 mm and a radius of 5 mm zigzag disposed at average intervals of 15 mm was prepared by zigzag disposing upward semicircular lumps of a mixture of hydrophilic carbon black and PTFE of which a width was 1 mm, a height was 0.1 mm and a radius was 5 mm, at average intervals of 15 mm on a sheet by means of spraying, placing the sheet in a jig, piling on the sheet a gas diffusion sheet having a thickness of 0.2 mm, a nickel current collector mesh having 50 mesh and a reaction layer sheet having a thickness of 0.1 mm in this turn, and hotpressing the piled members.

For evaluating the performance of the gas electrode thus prepared and conventional gas diffusion electrode without projections, the both electrodes were separately employed in a 25% NaOH solution as an oxygen reduction electrode to measure current densities. The current density of the conventional electrode was 160 $mA/cm^2$ at 0.7 V (hydrogen electrode standard) while that of the electrode of this Example was 390 $mA/cm^2$ at 0.7 V (hydrogen electrode standard) about 2.4 times that of the conventional electrode.

EXAMPLE 2

A gas electrode shown in FIGS. 7 and 8 was prepared similarly in accordance with the procedures of Example 1 except that projections were circular cones having a diameter of about 0.5 mm and a height of about 0.5 mm, and a belt-like perfluorinated film was formed between the adjacent two rows of the projections by applying a perfluorinated ionomer solution at a width of 1 mm and a length of 10 mm and thermally treating it for 30 minutes at 200° C.

The current densities of this electrode and the conventional electrode of Example 1 were measured. The current density of the conventional electrode was 490 $mA/cm^2$ at 0.7 V (hydrogen electrode standard) while that of the electrode of this Example was 580 $mA/cm^2$ at 0.7 V (hydrogen electrode standard) about 1.2 times that of the conventional electrode.

EXAMPLE 3

On a stainless steel coated with PTFE having a thickness of 1 mm on which a plurality of circular conical apertures having a depth of 0.5 mm and a diameter of 0.5 mm at average intervals of 1 mm, a gas diffusion layer sheet having a thickness of 0.8 mm, a length of 120 mm and a width of 120 mm were placed, and a nickel current collector mesh having a length of 150 mm, a width of 120 mm and 50 mesh were placed on the gas diffusion sheet, and further another gas diffusion layer sheet having a thickness of 0.5 mm, a length of 120 mm and a reaction layer sheet having a thickness of 0.15 mm, a length of 120 mm were placed on the nickel mesh as shown in FIG. 10. These piled members were hotpressed at 380° C. to form a gas electrode composed of a reaction layer and a gas diffusion layer having the nickel current collector mesh therein and having needle-like projections on its surface as shown in FIG. 9.

The current densities of the electrode of this Example and the above conventional gas diffusion electrode as an oxygen reduction electrode were measured in 1 M-NaOH solution and were compared. The current density of the conventional electrode was 160 $mA/cm^2$ at 0.7 V (hydrogen electrode standard) while that of the electrode of this Example was 480 $mA/cm^2$ at 0.7 V (hydrogen electrode standard) 3 times that of the conventional electrode.

EXAMPLE 4

A gas electrode of FIG. 11 was similarly prepared in accordance with the procedures of Example 3 except that a nickel plate having a plurality of trigonal pyramidal apertures was employed in place of the stainless steel of Example 3.

The current densities were measured in accordance with the procedures of Example 3. The current density of the conventional electrode was 160 mA/cm$^2$ at 0.7 V (hydrogen electrode standard) while that of the electrode of this Example was 490 mA/cm$^2$ at 0.7 V (hydrogen electrode standard) more than 3 times that of the conventional electrode.

EXAMPLE 5

A gas electrode of FIG. 13 was prepared by bonding 12 needles hydrophobically treated to a nickel current collector mesh coated with PTFE at a bonding angle of 45° which was hotpressed with a reaction layer and a gas diffusion layer.

The current densities were measured in accordance with the procedures of Example 3. The current density of the conventional electrode was 160 mA/cm$^2$ at 0.7 V (hydrogen electrode standard) while that of the electrode of this Example was 500 mA/cm$^2$ at 0.7 V (hydrogen electrode standard) more than 3 times that of the conventional electrode.

EXAMPLE 6

A bubble collecting and retaining member shown in FIGS. 14 to 16 was prepared by drawing a flat metal plate. This member was attached to the surface of a gas diffusion layer in a direction that a plurality of hoods face downward to prepare a gas diffusion electrode of FIGS. 14 to 16.

This electrode was installed in an electrolytic cell shown in FIG. 17 filled with a 20% KOH solution, and the current densities of this electrode and the conventional electrode were measured. The current density of the conventional electrode was 160 mA/cm$^2$ at 0.6 V while that of the electrode of this Example was more than 500 mA/cm$^2$ at 0.6 V more than 3 times that of the conventional electrode.

EXAMPLE 7

The same electrode was prepared as that of Example 6 except that a PTFE plate was employed in place of the metal plate, and the current densities were similarly measured and compared.

The current density of the electrode of this Example was more than 460 mA/cm$^2$ at 0.6 V more than about 2.9 times that of the conventional electrode.

What is claimed is:

1. A bubble collection gas electrode in an electrolyte comprising a reaction layer and a gas diffusion layer bonded with each other, where the gas diffusion layer has a plurality of projections on its surface slanted downwardly for collecting bubbles.

2. The gas electrode as claimed in claim 1, wherein the projections are continuous or intermittent hydrophilic projections separated from each other in a vertical direction.

3. The gas electrode as claimed in claim 1, wherein a contact angle of the hydrophilic projection with water is less than 90° and that of the gas diffusion layer is 90° or more.

4. The gas electrode as claimed in claim 1, wherein the projections are hydrophobic and shaped as needles.

5. The gas electrode as claimed in claim 4, wherein the heights of the hydrophobic needle shaped projections are uneven.

6. The gas electrode as claimed in claim 4, wherein the projections are made of hydrophobically treated metals.

7. The gas electrode as claimed in claim 4, wherein the needle shaped projections are inclined downward.

8. The gas electrode as claimed in claim 1, wherein a gas collecting and holding member which comprises a base plate having a plurality of openings and a plurality of hoods which cover the openings is attached to the surface of the gas diffusion layer.

9. The gas electrode as claimed in claim 8, wherein the openings are zigzag formed.

10. The gas electrode as claimed in claim 8, wherein a connection member is placed between two horizontally adjacent hoods.

11. The gas electrode as claimed in claim 8, wherein the gas collecting and holding member is made of metal.

12. The gas electrode as claimed in claim 8, wherein the gas collecting and holding member is made of synthetic resin.

13. The gas electrode as claimed in claim 1, wherein the gas diffusion layer is formed by a plurality of hydrophilic porous linear members and a plurality of hydrophobic linear members alternately disposed.

14. The gas electrode as claimed in claim 13, wherein the two linear members are horizontally disposed and vertically bonded.

15. The gas electrode as claimed in claim 14, wherein the two linear members are slightly bent.

16. The gas electrode as claimed in claim 14, wherein the two linear members are slightly curved.

17. The gas electrode as claimed in claim 1, wherein a gas permeable hydrophobic layer is placed on the gas diffusion layer, and a metal mesh or porous member which is permeable to an electrolyte and impermeable to the bubbles and of which an outer edge extends beyond the periphery of the reaction layer is placed between the gas diffusion layer and the reaction layer.

* * * * *